Figure 1:
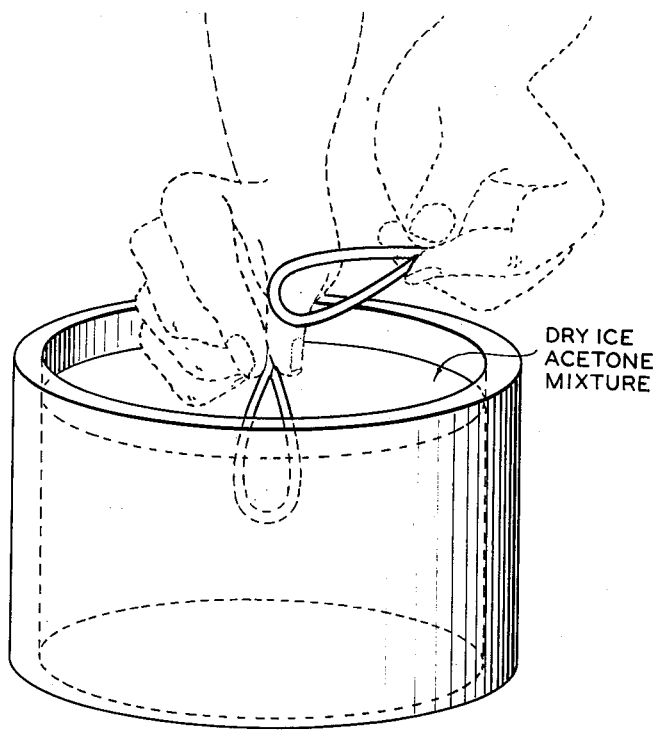

Nov. 19, 1957     R. V. JONES ET AL     2,813,809
WIRE COVERED WITH A HYDROGENATED
RUBBERY BUTADIENE POLYMER
Filed March 18, 1954

INVENTORS
R. V. JONES
C. W. MOBERLY
BY
Hudson and Young
ATTORNEYS

United States Patent Office 2,813,809
Patented Nov. 19, 1957

2,813,809

WIRE COVERED WITH A HYDROGENATED RUBBERY BUTADIENE POLYMER

Rufus V. Jones and Charles W. Moberly, Bartlesville, Okla., assignors to Phillips Petroleum Company, a corporation of Delaware Application March 18, 1954, Serial No. 417,104

4 Claims. (Cl. 117—232)

This application is a continuation-in-part of our prior application, Serial No. 395,291, filed November 30, 1953, said application Serial No. 395,291 being a continuation-in-part of our prior applications Serial No. 202,797, filed December 26, 1950, now abandoned, and Serial No. 270,944, filed February 11, 1952.

This invention relates to wire having an improved insulating cover thereon. In a further aspect this invention relates to wire covered with a hydrogenated rubbery butadiene polymer, said covering being flexible at a temperature of —100° F.

In the applications referred to above, we have described a new class of materials which can be produced by hydrogenating rubbery polybutadiene. A particularly valuable property of these materials is that of being flexible at sub-zero temperatures. These materials have also been found to have good dielectric properties. Because of these properties, the hydrogenated polymers have been found to be very suitable for use as insulating coverings for wire.

The polymer is hydrogenated by contacting it in a solvent in the presence of a specially prepared nickel kieselguhr catalyst. The products have, in addition to the properties set forth above, decreased solubility in many common solvents, increased tensile strengths, and increased resistance to ozone deterioration when compared to the unhydrogenated polymer. The hydrogenated products are unique in that, although they are thermoplastic they can be vulcanized. The vulcanized products have properties similar to vulcanized elastomers. The hydrogenated materials can be vulcanized by means of the usual vulcanization agents and compounded and processed by methods known to the art using the usual fillers, plasticizers, tackifiers, softeners, accelerators, retarders, accelerator activators, etc. They can be molded by conventional extrusion or compressing molding processes.

Each of the following objects is obtained by at least one of the aspects of this invention.

An object of this invention is to provide wire having an improved insulating coating thereon.

A further object of this invention is to provide wire having a coating thereon flexible at temperatures below —100° F., said coating comprising a hydrogenated rubbery butadiene polymer.

Other objects and advantages of this invention will become apparent to one skilled in the art upon reading this disclosure.

Accompanying this disclosure and forming a part thereof there is a drawing illustrating the product produced according to the present invention.

Figure 2:
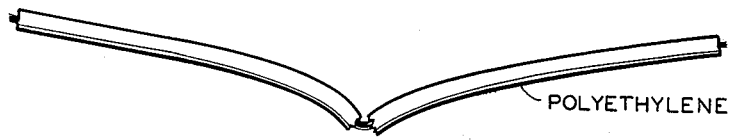
Figure 3:

The drawing includes,

Figure 1, showing wires coated with insulation being immersed in a Dry Ice acetone mixture; and Figures 2 and 3, showing wires straightened out following immersion.

At the present time, insulated wires are exposed to widely varying operating conditions. These may range from temperatures as low as —100° F. up to temperatures in the neighborhood of 400° F. Furthermore, ozone deterioration has become a serious problem, especially where insulated wires are used at very high altitudes, or in other places where the ozone concentration is high.

We have discovered that hydrogenated rubbery butadiene polymers, either in the vulcanized or unvulcanized state, provide a very satisfactory insulating covering for wire. These materials are applied to the wire by any suitable means such as by extrusion molding around the wire or by dipping the wire into a solution of the hydrogenated rubbery polymer. Since the coating has excellent insulating properties the wire covered therewith is very suitable for all electric purposes.

The products of the present invention are prepared by a catalytic hydrogenation procedure. In carrying out the process of our invention we charge a butadiene polymer, substantially free of salts or other materials which might act as hydrogenation catalyst poisons, to a suitable hydrogenation reactor in the form of a solution or dispersion in a suitable solvent. In some instances the polymer dissolves completely, while in other cases a dispersion is formed. This appears to be a function of the particular polymer. The solvent is preferably inert to hydrogenation but this is not an absolute requirement, since unsaturated materials can be used. When aromatic solvents are used they are usually hydrogenated concomitantly with the polymer. In such a case the solvent is frequently recovered and recycled to the hydrogenation process.

Suitable solvents include saturated cyclic hydrocarbons such as cyclohexane, methylcyclohexane, decalin, and the like, preferably boiling above atmospheric temperature. Aromatic hydrocarbons, such as benzene and toluene; cyclic ethers, such as dioxane; and paraffinic hydrocarbons such as isooctanes, isoheptanes, and normal heptane; hydroaromatic hydrocarbons such as tetralin; and the like, can also be used. Mixtures of solvents and/or dispersants can be used if desired.

In one embodiment, after the polymer has been dissolved in the solvent, the hydrogenation catalyst is added, hydrogen is added, and the temperature raised to a suitable level to initiate the reaction. This operation can be carried out in a batch-wise or a continuous process. When sufficient hydrogenation has been effected, usually as indicated by a decrease in unsaturation or a drop in hydrogen pressure, the reaction is stopped and the dispersion or solution treated by suitable means, such as by filtering, centrifuging, and the like, to remove the catalyst. The magnetizable catalyst can be removed very advantageously by passing the solution or dispersion after hydrogenation through a packing which has been energized with a high field flux by either permanent or electro-magnets. A suitable device is a tube packed with fine steel wool, fine magnetic rings, fine magnetic screens, etc. on the outside of which are the magnets. Demagnetizing the packing permits removal of the catalyst particles from the packing. A particular form of magnetic separator is disclosed in our copending application Serial No. 270,944, of which the present application is a continuation-in-part. Hydrogenated thermoplastic is then separated from the solvent or dispersing medium. Either the catalyst or the solution of polymer can be added in increments after the reaction temperature has been reached.

When the reaction is carried out in a continuous manner, a solution of the polymer containing the catalyst in suspension can be introduced into a tubular reactor and hydrogen introduced in to the reaction zone at one or more points. The reaction can also be carried out in a stirred autoclave by continuously introducing the reactants and continuously removing the products.

The polymers used to produce the thermoplastic materials of our invention can be selected from homopolymers of butadiene and copolymers of butadiene and styrene, using not over 30 parts by weight of styrene per 100 parts by weight of monomers. These polymers for use in this invention are prepared by emulsion polymerization, the temperature for the polymerization ranging from −5° F. to 140° F., preferably from 20° F. to 60° F. Polymers of butadiene produced at 41° F. have produced hydrogenated materials with the best balance of properties. Using the emulsion polymerization system, it has been found that approximately 75 to 85 percent of the butadiene polymer is formed as a result of 1–4 addition while 15 to 25 percent of the polymer is formed as a result of 1–2 addition.

Thermoplastics having the best balance of physical properties have been produced from rubbery polymers of butadiene and copolymers of butadiene and styrene, the styrene content limited as set forth above. For the products of our invention the polymer to be hydrogenated should have a Mooney viscosity below 40 (ML–4) measured at 212° F. Where the Mooney viscosity is above 40 it is preferable to mill or otherwise degrade the polymer prior to hydrogenation.

In our work it has been found that the hydrogenation process is simplified and that better products are produced if the polymer is vacuum dried or is dried in the presence of an inert atmosphere at a temperature not above 150° F. Air drying at temperatures around 220° F. has been used but it is not as satisfactory since, in general, the hydrogenation of a polymer so dried does not proceed as rapidly nor to as high degree of saturation when it is air dried at the higher temperature. Thorough washing of the polymer is desirable following coagulation.

Polymers can be recovered by adding a coagulant to a mixture of the latex and a solvent for the polymer. The polymer is recovered as a solution suitable for hydrogenation.

We have tried many hydrogenation catalysts but prefer to use a nickel-kieselguhr catalyst of a particular particle size which has been activated under particular conditions. In application Serial No. 202,797, we listed a series of catalysts including nickel-kieselguhr, Raney nickel, copper chromate, molybdenum sulfide, finely divided platinum, finely divided palladium, platinum oxide, copper chromium oxide, and the like, although it was stated that the nickel-kieselguhr catalyst was to be preferred. Further development work has shown that the nickel-kieselguhr catalyst is far superior to the others which have been tried. Rufert nickel has also been tried but again is inferior to the preferred nickel-kieselguhr catalyst.

Furthermore, it is this nickel-kieselguhr catalyst treated in a particular manner which produces the superior results. We prefer to use a finely divided catalyst having a particle size between 1 to 8 microns which has been activated at a temperature between 500 to 800° F. for a period of several hours by passing hydrogen thereover. A very suitable catalyst which we have used is such a nickel-kieselguhr catalyst treated at 675° F. for four hours using approximately 100 volumes of hydrogen per volume of catalyst. Such a treatment reduces at least a part of the nickel compound to elemental nickel, generally 35 to 40% of the nickel being reduced, but our work has shown that the reduced nickel content is not critical, and may vary from approximately 10 to 50 percent. Since the catalyst is charged on the unreduced basis, the weight of reduced catalyst is calculated and multiplied by the reduced nickel content to obtain the weight of reduced nickel set forth above. In the preparation of the catalyst the reduced nickel content of the catalyst increases with time, temperature, and hydrogen rate. In the hydrogenation of the polymer, 2 to 30 weight percent on the unreduced basis of catalyst based upon the weight of the polymer gives the preferred rate of hydrogenation.

The polymers can be hydrogenated according to the process of this invention and can be produced using the following ranges of reaction conditions. Reaction pressures are preferably in the range from atmospheric to 3000 p. s. i. g., the usual range being within 100 to 1000 p. s. i. g. The temperature can range from 75° F. up to the degradation temperature of the polymer, maximum temperatures ranging as high as 700 to 1000° F. The preferred range is between 300 and 600° F. Degradation has not been noted even when hydrogenation was carried out at 600° F. and a pressure of 2500 p. s. i. g., based on intrinsic viscosity tests. Reaction times in the range of 1 to 24 hours, preferably 2 to 8 hours can be employed. In the usual case no further hydrogenation takes place after 2 or 3 hours. The amount of catalyst required is also a function of the temperature of hydrogenation. That is to say, 10 percent by weight of catalyst at 500° F. produces approximately the same effect that 15 percent gives at 400° F.

In order to obtain polymers of the desired characteristics, the unsaturation should be reduced to a value of approximately 0 to 50 percent, based upon the theoretical value of 100 percent for the unhydrogenated butadiene polymer. Preferably the residual unsaturation in the product should be less than 30 percent. The value desired within this preferred range depends upon the use to which the particular hydrogenated material is to be put. If the hydrogenated material is to be vulcanized the residual unsaturation should be within the range of 15 to 30 percent, vulcanization being difficult when the polymer has an unsaturation below 10 and being almost impossible when this value is below 5. Materials having good ozone resistance are produced when the unsaturation is kept below 20 percent, this result being apparent both before and after vulcanization.

Hydrogenated polybutadiene prepared according to the process of our invention is a white, solid material when precipitated from solution, being similar in appearance to asbestos fibers. On molding, the products are colorless and transparent. The hydrogenated products are lighter in color than the unhydrogenated starting material. The hydrogenated polymers are very tough and have greater tensile strength than the starting materials, the tensile strengths being in the range of 750 to 4000 p. s. i., measured on the uncompounded stock at 80° F. and the elongation of these hydrogenated materials is greater than 500 percent.

Further evidence of the low temperature properties of these hydrogenated polymers is seen in their second order transition temperatures, sometimes referred to as the glassy state transition. The second order transition temperature of polybutadiene rubber is −94° F. The second order transition temperature of hydrogenated polybutadiene is below −256° F., no evidence of a glassy state transition being observed down to this temperature.

While the unvulcanized hydrogenated butadiene polymer gives a satisfactory wire coating, the vulcanized product is particularly advantageous. Both types of materials have excellent low temperature properties and can be used at temperatures as low as are obtained in liquid oxygen without cracking upon freezing. The vulcanized products also have good high temperature properties, being stable for extended periods at 400° F. and higher and have excellent ozone resistance which makes them particularly applicable for use at high altitudes.

As stated above, the coating can be applied by extruding the hydrogenated polymer onto the wire or by dipping the wire into a solution of the polymer. When the polymer is compounded the wire is first covered with this compounded material and the stock is then vulcanized. The hydrogenated polymers can be compounded without fillers or fillers such as carbon black, clays, aluminum oxide, lignin and titanium dioxide can be used. The amount of filler can be as much as 100 parts per 100 parts of polymer. Because of its conductive properties, loadings of carbon black should be kept low, say not over 10 parts per 100 parts of the hydrogenated polymer. Calcium carbonate is a preferred filler.

The products of this invention are easily distinguishable from other hydrogenated polymers. Polymers of methyl pentadiene have been prepared but these, upon hydrogenation yield a sticky, tacky material. Natural rubber, when hydrogenated does not produce a thermoplastic product, and synthetic rubbers such as polychloroprene and butadiene/acrylonitrile copolymer do not hydrogenate satisfactorily for use in this invention.

The drawing demonstrates the flexibility of the coating material of our invention. In the container shown in Figure 1, a Dry Ice acetone mixture is maintained. A length of the wire is shown immersed in this mixture. In Figures 2 and 3, pieces of wire, after being straightened out, are shown. The wire in Figure 2, having a polyethylene coating, has failed since the insulation has broken. In the wire in Figure 3, having a covering of hydrogenated rubbery polybutadiene, the wire was not brittle at this low temperature, below —100° F. In order to demonstrate more fully certain methods and operating conditions utilized in preparing the materials of this invention, the following examples are set forth. These are given for the purpose of illustration and should not be considered as unduly limiting the invention.

In the following examples, the electrical properties were determined on sheet stock according to ASTM D-150-47T.

EXAMPLE I

Polybutadiene having a Mooney value (ML–4) of 20, prepared by emulsion polymerization at 41° F., was hydrogenated in two different runs to give products having 13 and 24 percent unsaturation, respectively. The electrical properties of both products were determined. Results were as follows:

|  | Hydrogenated Polybutadiene | | | |
| --- | --- | --- | --- | --- |
|  | 13% Unsaturation | | 24% Unsaturation | |
|  | 1 kc.[1] | 1 mc.[2] | 1 kc.[1] | 1 mc.[2] |
| Dissipation factor | <0.0005 | 0.0065 | <0.0005 | <0.0044 |
| Dielectric constant | 2.25 | 2.28 | 2.24 | 2.26 |

[1] Kilocycle.
[2] Megacycle.

EXAMPLE II

A sample of hydrogenated polybutadiene having 13 percent unsaturation, described in Example I, was compounded in accordance with the following recipe:

| | Parts by weight |
| --- | --- |
| Hydrogenated polybutadiene | 100 |
| Zinc oxide | 5 |
| Stearic acid | 2 |
| Sulfur | 2 |
| Santocure [1] | 1 |
| A–32 [2] | 0.2 |

[1] N-cyclohexyl-2-benzothiazolesulfenamide.
[2] Reaction product of butyraldehyde and butylidene aniline.

The stock was cured 45 minutes at 307° F. and physical properties determined. Tensile strength, elongation, density, and electrical properties are shown below:

Tensile, p. s. i. _____ 1473
Elongation, percent _____ 547
Density _____ 0.943

Electrical properties:

|  | 1 kc. | 1 mc. |
| --- | --- | --- |
| Dissipation factor | 0.002 | 0.014 |
| Dielectric constant | 2.43 | 2.46 |

EXAMPLE III

The hydrogenated polybutadiene described in Example II was compounded using the recipe given in Example II except that, in addition, 50 parts by weight McNamee clay was added as a filler. The stock was cured 45 minutes at 307° F. Tensile strength, elongation, density, and electrical properties are shown below:

Tensile, p. s. i. _____ 2247
Elongation, percent _____ 657
Density _____ 1.16

Electrical properties:

|  | 1 kc. | 1 mc. |
| --- | --- | --- |
| Dissipation factor | 0.008 | 0.026 |
| Dielectric constant | 2.84 | 2.79 |

EXAMPLE IV

Polybutadiene having a Mooney value (ML–4) of 20, prepared by emulsion polymerization at 41° F., was hydrogenated to give a product having an unsaturation of 22.2 percent. This material was compounded using the recipe given in Example II except that, in addition, 100 parts by weight of titanium dioxide and 1 part Agerite Alba (hydroquinone monobenzyl ether) were added. The stock was cured 45 minutes at 307° F. Results of physical tests were as follows:

Tensile, p. s. i. _____ 1103
Elongation, percent _____ 480

Electrical properties:

|  | 1 kc. | 1 mc. |
| --- | --- | --- |
| Dissipation factor | 0.0097 | 0.0113 |
| Dielectric constant | 4.87 | 4.59 |

EXAMPLE V

A portion of a 20 Mooney value (ML–4) polybutadiene, prepared by emulsion polymerization at 41° F., was hydrogenated to give a product having an unsaturation of 30 percent. This material was compounded using the recipe given in Example II except that, in addition, 50 parts by weight of carbon black (Philblack A) was added. The stock was cured 45 minutes at 307° F. Results of physical tests were as follows:

Tensile, p. s. i _____ 1869
Elongation, percent _____ 380
Gehman freeze point, °F _____ —89
Compression set, percent _____ 18.6

The Gehman freeze point determination reported herein is a modification of ASTM D–1053–52T, the result being an extension of the steep portion of the curve extrapolated to 0° twist.

Electrical properties:

|  | 1 kc. | 1 mc. |
| --- | --- | --- |
| Dissipation factor | 0.0168 | 0.04 |
| Dielectric constant | 6.52 | 5.88 |

EXAMPLE VI

A portion of polybutadiene having a Mooney value (ML–4) of 10, prepared by emulsion polymerization at 41° F., was hydrogenated to give a product having a residual unsaturation of 7.2 percent. Electrical properties were as follows:

|  | 1 kc. | 1 mc. |
| --- | --- | --- |
| Dissipation factor | <0.0005 | <0.0005 |
| Dielectric constant | 2.43 | 2.15 |

This material was coated upon a piece of copper wire, a second piece of the same wire being coated with commercial polyethylene, and both wires subjected to a temperature of —100° F. Upon being flexed at this temperature, the polyethylene coating cracked while the hydrogenated polybutadiene covering did not. These are the wires shown in the drawing accompanying this specification.

EXAMPLE VII

Polybutadiene having a Mooney value (ML-4) of 20, prepared by emulsion polymerization at 41° F. was hydrogenated to give a product having residual unsaturation of 16.7 percent. It was used to coat copper wire both in the raw and compounded state. A smooth uniform coating was obtained in both cases. The uncompounded product had the following properties:

|  | 1 kc. | 1 mc. |
| --- | --- | --- |
| Dissipation factor | 0.0005 | 0.0022 |
| Dielectric constant | 2.3 | 2.3 |

Tensile, p. s. i. _____ 965
Elongation, percent _____ 800
Flex temperature, °F. _____ —85
(G=135,000 p. s. i. in ASTM D-1043-51)

The following recipe was used for the compounded stock:

| | Parts by weight |
| --- | --- |
| Hydrogenated polybutadiene | 100 |
| TiO$_2$ | 10 |
| ZnO | 5 |
| Stearic acid | 2 |
| Red pigment [1] | 2 |
| N,N-dimethyl-S-tert-butylsulfenyl dithiocarbamate | 2 |
| Sulfur | 2 |

[1] Ferro red 6848.

A portion of the compounded polymer was cured 45 minutes at 307° F. and physical properties determined. The following results were obtained:

|  | 1 kc. | 1 mc. |
| --- | --- | --- |
| Dissipation factor | 0.00516 | 0.0127 |
| Dielectric constant | 2.7 | 2.6 |

Tensile, p. s. i _____ 1837
Elongation, percent _____ 570
Flex temperature, °F _____ —72

Thus it is apparent that vulcanization increases the dielectric constant and the dissipation factor.

On another sample of wire a compounded stock was applied and vulcanized following this application. This coating was also flexible at the —100° F. temperature.

EXAMPLE VIII

Another portion of the compounded polymer of Example VII was extruded onto copper wire. The composition extruded easily with no setting up taking place. Small pieces of the compounded coating, after extrusion, were placed in oven at 112° F. and cured for 5 days. The tensile strength was determined and found to be 2455 p. s. i. Before the heating period the tensile strength of the extruded, compounded but uncured material, was 1375 p. s. i. The tensile strength of the press cured slab was less than that of the extruded and cured stock, indicating that orientation occurred during extrusion.

EXAMPLE IX

Aluminum oxide (Alon C), calcium carbonate (Kalite and Surflex MM), clay (Bentone-34), lignin (Indulin A) and carbon black (Philblack E) were employed as fillers at levels of 10 and 20 parts by 100 parts of a hydrogenated polymer having an unsaturation of 16.7 percent. The stocks were not compounded nor vulcanized. The hydrogenated polymer, without any filler had the following properties:

Tensile, p. s. i. _____ 1250
Elongation, percent _____ 800
Flex temperature, °F _____ —85

|  | 1 kc. | 1 mc. |
| --- | --- | --- |
| Dissipation factor | <0.0005 | 0.0022 |
| Dielectric constant | 2.3 | 2.3 |

In general, the tensile strength and elongation were changed very little by the addition of these fillers. Using lignin, as a filler, the tensile strength was reduced to about 750 pounds per square inch, the balance of the fillers not changing the tensile strength more than ±100 pounds per square inch from the tensile strength of the unfilled polymer. The flex temperature was raised by all the fillers approximately 10 to 20° F. Calcium carbonate was the filler which gave the best dielectric properties, these being as follows:

|  | 1 kc. | 1 mc. |
| --- | --- | --- |
| Dissipation factor | 0.0009 | 0.0031 |
| Dielectric constant | 2.4 | 2.1 |

Carbon black, being a semi-conductor, is poor for use as a filler when good dielectric properties are desired. At 10 pounds carbon black per 100 pounds of the hydrogenated polymer, the dielectric properties were as follows:

| | 1 kc. |
| --- | --- |
| Dissipation factor | 0.217 |
| Dielectric constant | 4.7 |

EXAMPLE X

Calcium carbonate, because of the good dielectric properties obtained therewith has also been used with higher loadings as well as with vulcanized stocks, the vulcanized stocks being compounded according to the following recipe and cured at 307° F. for 45 minutes.

| | Parts by weight |
| --- | --- |
| Hydrogenated polybutadiene | 100 |
| ZnO | 5 |
| Stearic acid | 2 |
| N,N-dimethyl-S-tert-butylsulfenyl dithiocarbamate | 2 |
| Sulfur | 2 |
| Hydroquinone monobenzyl ether | 2 |

Vulcanization increased the tensile strength to 1800 pounds per square inch using 20 and 50 parts per 100 parts of the hydrogenated polymer of Example IX with 20 parts of the calcium carbonate, the flex temperature was raised to —63° F. and with 50 parts was raised to —55° F. The dielectric properties of the stocks are shown below:

*50 parts calcium carbonate per 100 parts hydrogenated polybutadiene (not vulcanized)*

|  | 1 kc. | 1 mc. |
| --- | --- | --- |
| Dissipation factor | 0.0029 | 0.0033 |
| Dielectric constant | 2.7 | 2.7 |

*50 parts calcium carbonate per 100 parts hydrogenated polybutadiene (vulcanized)*

|  | 1 kc. | 1 mc. |
|---|---|---|
| Dissipation factor | 0.0041 | 0.0122 |
| Dielectric constant | 3.0 | 3.1 |

*20 parts calcium carbonate per 100 parts hydrogenated polybutadiene (vulcanized)*

|  | 1 kc. | 1 mc. |
|---|---|---|
| Dissipation factor | 0.0045 | 0.0111 |
| Dielectric constant | 2.7 | 2.4 |

EXAMPLE XI

For comparison, the dielectric properties of various unhydrogenated butadiene/styrene elastomers were determined. These polymers were made at monomer ratios 100/0, 90/10, 80/20, 72/28, 60/40, and 40/60 butadiene/styrene and were compounded according to the following recipe:

|  | Parts by weight |
|---|---|
| Elastomer | 100 |
| Stearic acid | 2 |
| Zinc oxide | 10 |
| Kaolin | 100 |
| $CaCO_3$ | 50 |
| Sulfur | 2 |
| Benzothiazyl disulfide | 1.25 |
| Zinc dimethyldithiocarbamate | 0.5 |
| Paracoumarone resin | 15 |
| Phenyl - beta - naphthylamine | 1.5 |

Properties of these stocks, following a 20 minute cure, were as follows:

| Polymer | Compounded MS-1½ | Dissipation factor | | Dielectric constant | |
|---|---|---|---|---|---|
|  |  | 1 kc. | 1 mc. | 1 kc. | 1 mc. |
| 100/0 | 36.5 | 0.202 | 0.270 | 4.32 | 3.84 |
| 90/10 | 30.5 | 0.216 | 0.308 | 4.35 | 3.94 |
| 80/20 | 43 | 0.216 | 0.307 | 4.37 | 3.86 |
| 72/28 | 45 | 0.189 | 0.300 | 4.36 | 3.83 |
| 60/40 | 44.5 | 0.175 | 0.256 | 4.13 | 3.66 |
| 40/60 | 40.5 | 0.202 | 0.166 | 4.26 | 3.76 |

As many possible embodiments may be made of this invention without departing from the scope thereof, it is to be understood that all matter herein set forth is to be interpreted as illustrative and not as unduly limiting the invention.

We claim:

1. As an article of manufacture, wire having, as insulation thereon, a covering of a vulcanized rubbery polymer selected from the group consisting of homopolymers of butadiene and copolymers of butadiene and styrene containing not over 30 percent by weight of styrene, the unsaturation of said polymer having been reduced by hydrogenation to a value of 10 to 30 percent of the original unsaturation, said covering being flexible at −100° F. and being thermoplastic prior to vulcanization, said covering having been vulcanized following application thereof to said wire.

2. The article of claim 1 in which a filler is present.

3. The article of claim 2 in which said filler is calcium carbonate.

4. As an article of manufacture, wire having, as insulation thereon, a covering of a vulcanized rubbery homopolymer of butadiene, the unsaturation of said polymer having been reduced by hydrogenation to a value of 10 to 30 percent of the original unsaturation, said covering being flexible at −100° F. and being thermoplastic prior to vulcanization, said covering having been vulcanized following application thereof to said wire.

References Cited in the file of this patent

UNITED STATES PATENTS

| 2,046,160 | Graves | June 30, 1936 |
| 2,046,257 | Flint | June 30, 1936 |
| 2,109,495 | Marks | Mar. 1, 1938 |
| 2,312,024 | Brown | Feb. 23, 1943 |
| 2,693,461 | Jones | Nov. 2, 1954 |
| 2,743,233 | Fisher | Apr. 24, 1956 |

OTHER REFERENCES

Gregory: Uses and Applications of Chemicals and Related Materials, vol. II, Rinehold Publishing Corp. (1944), pp. 60, 61.